May 22, 1928.

T. K. WHITE

ROLLING WINCH

Filed Jan. 24, 1927

1,670,428

T. K. White
Inventor

By CA Snow & Co.
Attorneys

Patented May 22, 1928.

1,670,428

UNITED STATES PATENT OFFICE.

THOMAS K. WHITE, OF HURON, SOUTH DAKOTA.

ROLLING WINCH.

Application filed January 24, 1927. Serial No. 163,091.

This invention has reference to a rolling winch, and aims to provide a winch including a frame, a supporting axle, and wheels loosely mounted on the supporting axis, means being provided for rotating the axle to wind a chain or rope thereon for lifting heavy articles, such as rocks, piping or the like.

Another object of the invention is to provide a device of this character wherein the frame will act in conjunction with the supporting wheels in such a way as to provide a three-point suspension for the device, to insure against movement of the device while the same is in operation.

A still further object of the invention is to so construct the axle of the device that it may be efficiently employed as a winding drum, means being secured to the axle for connecting the rope or chain thereto.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
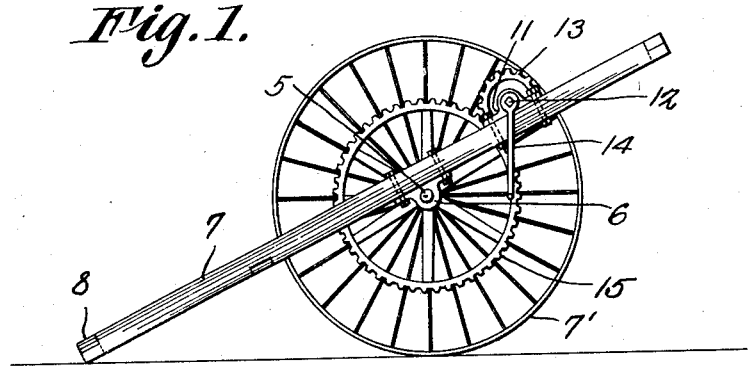
Figure 1 is a side elevational view of a device constructed in accordance with the invention.
Figure 2:
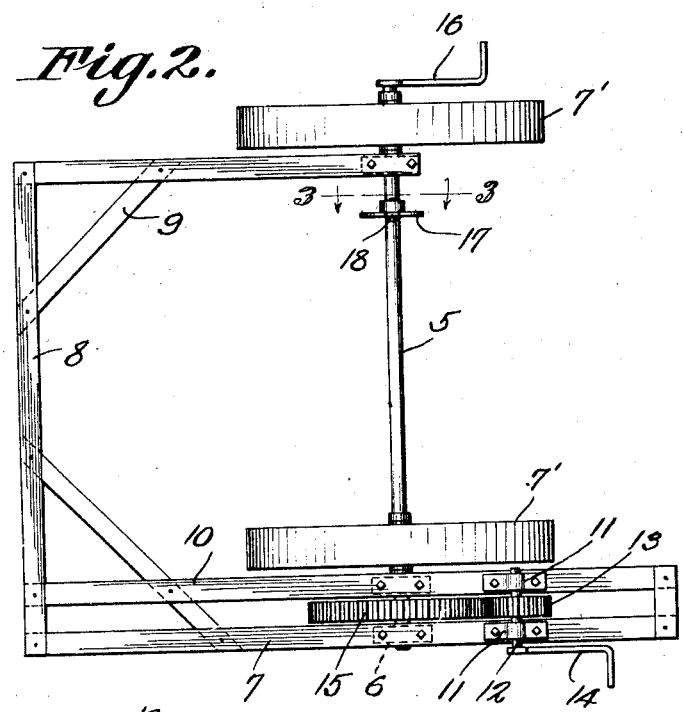
Figure 2 is a plan view thereof.
Figure 3:
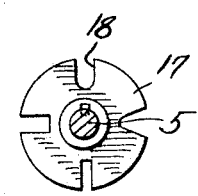
Figure 3 is a sectional view taken on line 3—3 of Figure 2.

Referring to the drawing in detail, the device includes a supporting axle indicated by the reference character 5 which axle is mounted for rotation in the bearings 6 that are secured to the side bars 7 of the frame of the device, the side bars being connected by the bar 8 and braced with respect to the bar 8, by means of the bracing bars 9 that are disposed at oblique angles. Wheels 7' are loosely supported on the axle 5 and support the device for movement over the ground surface.

The side bar 7 at one end of the axle is substantially long to provide a gear support with the bar 10 which is disposed in parallel relation with the bar 7 and arranged in spaced relation therewith. Bearings 11 are mounted on the bar 10 and bar 7 associated therewith, which bearings receive the shaft 12 on which the gear 13 is mounted, the shaft 12 being provided with a squared extremity to receive the crank handle 14 for rotating the shaft and gear.

Operating between the bars 7 and 10 at one end of the frame is a gear 15 that is keyed to the shaft, and meshes with the gear 13 to receive motion therefrom, with the result that when the gear 13 is operated, the gear 15 and axle supporting the gear will be rotated for purposes to be hereinafter more fully described.

The opposite end of the axle 5 is also squared to receive the crank handle 16, so that power may be applied to each end of the axle 5 should it be desired to lift an exceptionally heavy article. In order that the lifting chain or rope may be secured to the axle 5, a disk 17 is provided and secured to the axle adjacent to one end thereof, the disk being provided with cut out portions 18 formed in its periphery in which a chain may be positioned or a rope held adjacent to its end, it being understood that the cut out portions in the disk are of widths to prevent a link of a chain or a knot of a rope from being pulled therethrough when strain is brought to bear on the rope or chain.

In the use of the device, should it be desired to elevate a stone or pipe from an excavation, the device is positioned in such a way that the rope or chain may be dropped into the excavation and secured to the stone or pipe, whereupon the frame is dropped to the ground surface, and if necessary anchored; however, it is to be understood that the anchoring of the frame is unnecessary under normal conditions.

Power is now applied to the axle 5 to cause the rope or chain to be wound thereon, with the result that the article secured to the rope or chain is elevated, and suspended by the axle 5.

The device may now be moved on its wheels to move the article lifted, to a place of deposit where it may be released from the chain or rope lifting the same.

I claim:

In a device of the character described, a frame including a long side and a short side, the long side embodying a pair of spaced bars, a shaft connected with the frame, a wheel loosely mounted on the shaft at the outer side of the short bar of the frame, a wheel mounted on the shaft at the opposite end thereof, and arranged adjacent to the inside of the long side of the frame, gearing mounted between the bars of the long side of the frame and having connection with the shaft to rotate the shaft, and means on the shaft to secure one end of a cable thereto.

In testimony that I claim the foregoing as my own, I have hereto affixed my signature.

THOMAS K. WHITE.